United States Patent
Darling et al.

(10) Patent No.: US 10,630,652 B2
(45) Date of Patent: Apr. 21, 2020

(54) DATA-CENTRIC SECURE DATA TECHNOLOGY, ARCHIVING, AND STORAGE SYSTEM

(71) Applicants: Janine Darling, Stamford, CT (US); Christopher Evans, Las Vegas, NV (US); Paul Twomey, Las Vegas, NV (US)

(72) Inventors: Janine Darling, Stamford, CT (US); Christopher Evans, Las Vegas, NV (US); Paul Twomey, Las Vegas, NV (US)

(*) Notice: Subject to any disclaimer, the term of this patent is extended or adjusted under 35 U.S.C. 154(b) by 274 days.

(21) Appl. No.: 15/857,797

(22) Filed: Dec. 29, 2017

(65) Prior Publication Data

US 2019/0207910 A1     Jul. 4, 2019

(51) Int. Cl.
| | |
|---|---|
| *H04L 29/06* | (2006.01) |
| *H04L 9/14* | (2006.01) |
| *H04L 9/32* | (2006.01) |
| *G06F 21/60* | (2013.01) |
| *H04L 29/08* | (2006.01) |
| *H04L 9/06* | (2006.01) |
| *G06F 21/62* | (2013.01) |

(52) U.S. Cl.
CPC ........ *H04L 63/0428* (2013.01); *G06F 21/602* (2013.01); *G06F 21/6218* (2013.01); *H04L 9/0643* (2013.01); *H04L 9/14* (2013.01); *H04L 9/3226* (2013.01); *H04L 63/12* (2013.01); *H04L 63/166* (2013.01); *H04L 67/1097* (2013.01)

(58) Field of Classification Search
CPC ...... H01S 5/0422; H01S 3/137; H01S 3/1062; H01S 3/0637; H01S 3/30; H01S 3/083; H01S 5/068; H01S 5/1071; H01S 5/026
See application file for complete search history.

(56) References Cited

U.S. PATENT DOCUMENTS

| | | | |
|---|---|---|---|
| 7,089,322 B1 * | 8/2006 | Stallmann | G06Q 20/20 705/14.34 |
| 9,800,579 B2 * | 10/2017 | Bao | H04L 63/0876 |
| 2002/0176575 A1 * | 11/2002 | Qawami | G06F 21/10 380/201 |
| 2007/0077925 A1 * | 4/2007 | Hiyama | H04M 1/66 455/420 |
| 2008/0022135 A1 * | 1/2008 | Gaya | H04L 29/06 713/193 |
| 2013/0305039 A1 * | 11/2013 | Gauda | G06F 21/6218 713/153 |
| 2015/0339930 A1 * | 11/2015 | McCann | G08G 5/0039 701/528 |

* cited by examiner

*Primary Examiner* — Mohammed Waliullah
(74) *Attorney, Agent, or Firm* — John L. Sotomayor

(57) ABSTRACT

Current data archiving and storage solutions seek to store data in the most accessible manner possible, often foregoing security for sake of user convenience. The technology, system, and methods proposed in this document seek to protect data in a highly resilient, secure manner, suitable for extremely long-term periods of time without loss of data integrity. The proposed solution includes methods for storing digital data, validating the integrity of the data on both sides of the transmission, encryption with keys that only the user has access to, splitting files into obfuscated slices for increased security, and determining the most effective storage location according to a novel cost metric.

6 Claims, 3 Drawing Sheets

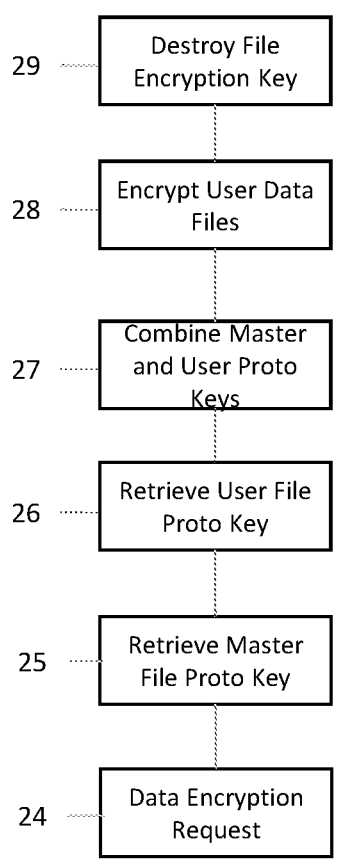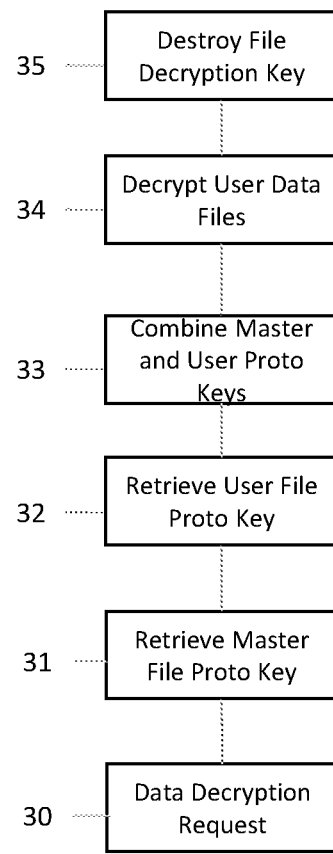
Figure 004                    Figure 005

DATA-CENTRIC SECURE DATA TECHNOLOGY, ARCHIVING, AND STORAGE SYSTEM

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Attacks targeting non-structured data on systems continue to occur. Attackers repeatedly compromise information on corporate, government, and personal computers despite new advances in computer security such as firewalls, intrusion detection systems, and other technologies. The underlying problem is that the data is not kept in a secure manner; and only by securing the data at the lowest level possible can attacks against data be stopped.

Other data storage solutions seek to store massive amounts of data in the most accessible manner possible, often foregoing security measures for sake of convenience, ease of use, or accessibility. Network attached storage, local storage, and file system connected data storage methods are dependent on the operating system to provide users access to their files. This dependence introduces another, significant, attack vector that can be exploited to compromise data. Other methods and tools do not store data in a secure format, leaving the data open to be compromised through attacks against the storage medium itself.

Data security and data integrity are integral to network and computer security. Although numerous systems have been created to address these factors, data security breaches continue to occur.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 4 is a view of the key generation and encryption process consistent with certain embodiments of the present invention.

FIG. 5 is a view of the key generation and decryption process consistent with certain embodiments of the present invention.

DETAILED DESCRIPTION

Figure 1:
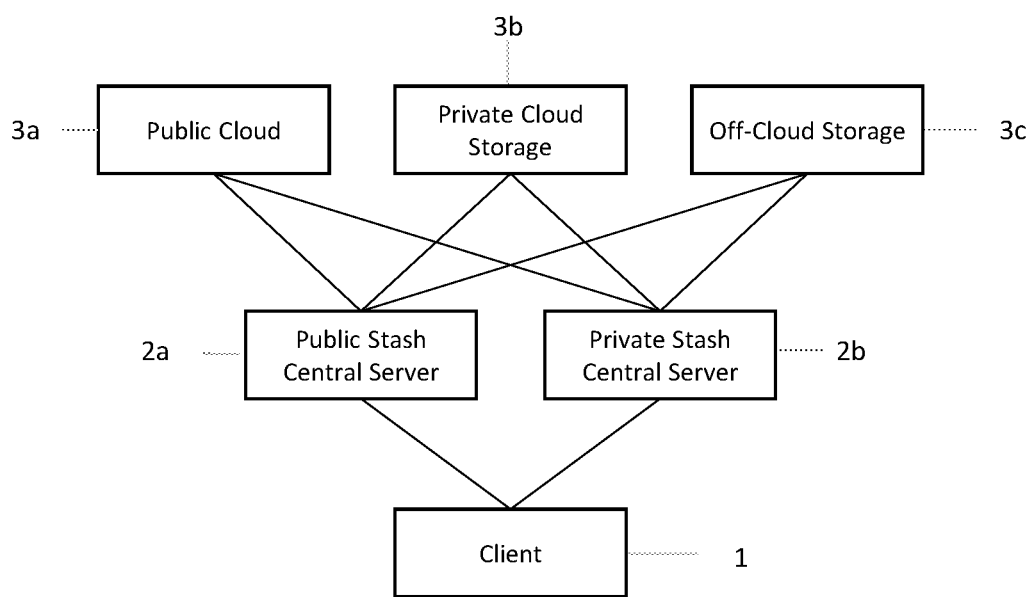
FIG. 1 is a view of the system architecture with deployment and file storage options consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

This document discloses embodiments that relate to network and computer security for data security and data integrity. These embodiments may take the form of providing for the data-centric protection, security, integrity, archiving, and storage of data committed to computer networks in any storage form or format.

In an embodiment of the invention, a system and method for securing and storing data in such a manner that makes it unreadable in its constituent parts (or slices) is proposed. The system delivers a secure archiving and storage solution for data files of any kind. The system provides a user interface to add files, and access, modify, or delete files. The system uses secure methods to receive files, and to ensure the integrity of the file matches the original file provided, encrypts the file with a file encryption key that is generated on-demand, splits the encrypted data file into an arbitrary number of slices, and finally copies the files to secure data storage and archiving locations according to a defined storage algorithm based on metrics related to geographic location, storage location cost, data transmission cost, and/or distribution pattern. The system reverses this process when a retrieval request is made. The system retrieves the slices, reassembles the slices, generates the user-specific file decryption key on-demand, decrypts the file, and presents the decrypted file it in its original format to the user.

The embodiment provides for data security and data integrity by calculating a total cost metric for data storage. The total cost metric may be composed of the storage location cost, the data transmission cost, and any cost associated with providing for a particular distribution pattern for data slice dispersion. The storage determination may be optimized through use of a metric to determine the number of data slices based on maximizing the number of slices and optimizing the speed of copying the slices to arbitrary data storage locations. Further, the process provides for storage of the reassembly information with the data slices themselves rather than in a central location. This embodiment achieves speed improvements through encrypting the data file first, rather than creating slices of the data file and subsequently encrypting the individual slices.

In an embodiment, the system may be implemented through various architectural configurations with a central server and file slice storage and archiving locations that may be co-located with the central server or remotely located through network connections to other servers and storage locations. The system may use a centralized public cloud server using public cloud storage locations for the individual slices. Alternatively, the system may utilize a private cloud or dedicated hardware server for the central server, and private cloud storage or local, off-cloud storage for the individual slices.

In an embodiment, a device associated with an end user may interact with the central server and initiate transfers to, and request transfers of digital data from, the central server. The end-user device may be implemented as a mobile device such as cell, mobile, or smartphone, a tablet form factor device, a laptop form factor device, a desktop form factor device, a network computer form factor device, or any similar end-user client device having network communication capability either through wired or wireless connections. The end-user device may also be implemented as a server form factor device.

In an embodiment of the invention, a Client may select a digital file, or files, accessible from their system on local storage device co-located with the Client, a remote storage device, or cloud storage device, and trigger the file transmission and secure storage method. This method can be initiated through a Client request, for example, a user logging into the web application and starting a file transfer. It could also be initiated through an Application Programming Interface (API) on behalf of a user through another application.

In an embodiment, the Client instructs the system to compute a hash, or a one-way, unique representation of the digital file(s). This hash is computed over a representative sample of the digital file, with a minimum of the first part of the digital file and the last part of the digital file, with parts of arbitrary size, all the way up to a maximum of the hash being computed over the entire digital file. This hash is computed using existing methods such as, but not limited to MD5, SHA1, RIPEMD, SHA256, or any other hash computation method preferred for implementation, and is performed by Client directed software modules or devices which support these functions. This hash is securely transmitted to the central server.

The Client instructs the system to send the contents of the digital file(s) via secure methods to the central server. The file is deconstructed into blocks for transmission by the Client device web browser, application programming interface, or other method as supported by the Client directed software module or device. The blocks are transmitted to the central server through secure methods using Transport Layer Security (TLS) or Secure Sockets Layer (SSL) technology. The current prototype mode of implementation uses HTML5 within the Client web browser to deconstruct the digital file(s) into blocks and transmits them via a TLS protected communication pathway with the central server.

Upon receipt of the file from the Client, the central server computes a hash, or a one-way, unique representation of the digital file(s). This hash is computed over a representative sample of the digital file(s) with a minimum of the first part of the digital file and the last part of the digital file, with the parts being of arbitrary size, up to a maximum of the hash being computed over the entire digital file(s). This hash is computed using existing methods such as, but not limited to MD5, SHA1, RIPEMD, SHA256, etc, and is performed by a central server. This hash is used to identify the file on the central server, and the file(s) is/are named with this hash. The advantage of calculating a hash on a representative sampling of the file is speed improvements over calculating the hash of the entire file. The implementation is through use of server-side PHP functions in the web application to calculate the hash of the file.

The central server uses a split-key method that requires two proto-keys to be combined into a single key for encrypting or decrypting files. Each user has a unique file encryption proto-key and the central server has another proto-key, the unique file encryption proto-key and the central server proto-key are combined, on-demand, to create the file encryption key. This file encryption key is then used to encrypt the digital file(s) transmitted by the client, after which, it is destroyed. The implementation uses publicly available AES-256 algorithm to encrypt the digital file(s) with the on-demand generated file encryption key.

The encrypted data file(s) on the central server are split into an arbitrary number of slices. The number of slices is determined by a storage cost metric, further described below. The central server splits the data file(s) into the determined number of slices, as equal in size as possible, and writes the instructions for recombining the slices into each slice, such that the central server can recombine the slices.

The central server uses a framework for identifying slice storage locations that allows new storage locations to be added or removed with ease. Each storage location is identified to the central server through use of four key functions: 1) upload, 2) download, 3) delete, and 4) "deleteLocation". The upload function contains methods specific to the storage location for transmitting or otherwise writing the slice from the central server to the storage location. The download function contains methods specific to the storage location for receiving or otherwise reading the slice from the storage location to the central server. The delete function contains methods specific to the storage location for securely removing a file from the storage location. The "deleteLocation" function contains methods specific to the storage location for removing any user specific identifiers and all data from the storage location. Each storage location also has a cost metric associated, as calculated through a number of parameters, identified in a separate section. The implementation is through a PHP web application with the details of each location stored in a database on the central server.

The system uses a cost function to determine where to store the slices. The cost function is comprised of several metrics which are separately weighted to determine the overall cost of storing a slice in a particular location. The following metrics are used in the function:

Location storage cost, as dollars per Gigabyte of storage, based on costs from the file location storage provider.

Slice transmission cost, as dollars per Gigabyte of bandwidth, from the service provider.

Slice transmission time, reflecting the response time between the central server and the file storage location.

Entropy, as a weighted value, reflecting the desired number of slices and storage method (single location, round robin, or random) to ensure sufficient security of the original digital file; prioritizes storage costs over transmission costs.

Frequency of access, as a weighted value, reflecting the expected frequency the digital file comprised of the slices, will be requested by the Client; prioritizes transmission cost and response times over storage costs.

Responsiveness, as a weighted value, reflecting the responsiveness of the storage location as measured by the time to live (TTL), or round trip time (RTT), or other measurement of communication pathway speed. The metrics are reflected in the following function which determines the cost for use of a specific storage location:

$$Cost_{sl} = (StorageCost_{sl}/\max(StorageCosts_{sl1}, \ldots, StorageCost_{sln}))*Entropy + (TransmissionCost_{sl}/\max(TransmisionCost_{sl1}, \ldots, TransmissionCost_{sln}))*Frequency + (Speed/\max(Speed_{sl1}, \ldots, Speed_{sln}))*Responsiveness$$

Additional parameters that may be combined with the above cost algorithm may include geographic location and geographic boundary constraints. Including these parameters may provide for additional total cost refinement.

Upon determination of all of the slice locations, the central server uses the upload function within the file storage framework to determine the methods for transmitting or writing the encrypted slices to their respective locations. If the storage location is separate from the central server and remotely accessible via a network, the central server uses secure methods to transmit the files. In the case of local storage, where the location is a part of the server, or available through a closed bus (e.g. USB, fiber channel, etc) the central server will use file copy methods within the central server to write the data to the file storage location. The current prototype mode of implementation uses Transport Layer Security (TLS) or Secure Sockets Layer (SSL) and web-enabled HTML POST methods to copy the slices from the central server to the file storage location.

The system presents the user with a view of all the files stored on their behalf, regardless of the actual storage location and the number of slices involved. A user may perform rudimentary file operations on each file such as download/read, copy, move, and rename. The user sees the original file name for each file they stored within the system while each of the files and each slide is given a globally separate and unique name.

When the system receives an identifier for a file selected for download by a user, the central server initiates a download request from the file storage location for each of the slices which constitute the requested file. The central server uses the download function within the file storage framework to determine how to retrieve the slices from the file storage location(s). The central server downloads the file slices and writes them to a temporary storage location on the central server. This transmission is done in a secure manner using a protected communication path through use of Transport Layer Security (TLS), or Secure Sockets Layer (SSL) encryption. The implementation is through a PHP web application running on the central server.

The central server reads the instructions from each of the slices to determine instructions for reassembling the file slices back into the original, encrypted file(s). The instructions may include ordering and transformative steps in order to return the file(s) to their complete encrypted state. Once reassembled, the file slices are securely deleted from the central server. The implementation is through a PHP web application running on the central server.

The central server decrypts the file(s) using a split-key method that requires two proto-keys to be combined into a single decryption key. Each user has a unique file decryption proto-key and the central server has another proto-key. They are combined, on-demand, to create the file decryption key. This file decryption key is then used to decrypt the digital file(s), after which, it is destroyed. The implementation uses publicly available AES-256 algorithm to decrypt the digital file(s) with the on-demand generated file encryption key.

Upon decrypting the digital file(s), the central server computes a hash, or a one-way, unique representation of the digital file(s). This hash is computed over a representative sample of the digital file(s) with a minimum of the first part of the digital file and the last part of the digital file, with the parts being of arbitrary size, up to a maximum of the hash being computed over the entire digital file(s). This hash is computed using existing methods such as, but not limited to MD5, SHA1, RIPEMD, SHA256, etc, and is performed by central server. This hash is used to identify the file on the central server, and the file(s) is/are named with this hash. The advantage of calculating a hash on a representative sampling of the file is speed improvements over calculating the hash of the entire file. If the computed hashes match the record of the original file, the reconstructed and decrypted file is a representation of a duplicate of the original file. An additional improvement over current processes is that the decryption process and hash calculations are done in blocks, with each block being immediately transmitted to the Client device that initiated the request. In this manner, no unencrypted data is written to the central server location, minimizing the risk of the contents of the original digital file(s) being compromised. The implementation is through use of server-side PHP functions in the web application to calculate the hash of the file.

The central server delivers the digital file(s), decrypting and hashing each block on the fly, before transmitting it via a secure communication path back to the Client device.

The system associated with the Client is instructed by the central server to compute a hash, or a one-way, unique representation of the digital file(s). This hash is computed over a representative sample of the digital file with a minimum of the first part of the digital file and the last part of the digital file, with the parts being of arbitrary size, all the way up to a maximum of the hash being computed over the entire digital file. This hash is computed using existing methods such as, but not limited to MD5, SHA1, RIPEMD, SHA256, or any currently available hash calculation method, and is performed by Client devices which support these functions. This hash is securely transmitted to the central server and the Client notified when the reassembly, decryption, and transmission of the file is successful. The implementation is through use of Client-side javascript to calculate the hash of the file.

In an embodiment, a system is herein described for secure data storage and retrieval, consisting of a processor having network connections to a plurality of networked storage locations where the processor receives one or more data files from a user through a network connection. The system encrypts one or more data files and generates an identifier for each encrypted data component. The system then splits the one or more encrypted data files into smaller data components which are herein known as slices. The system may calculate the transmission path cost from said processor to each of said plurality of networked storage archives and store each identifier for each encrypted data component in an electronic storage element associated with said processor. The system may store each encrypted data component into one of the plurality of networked storage locations based upon a set of calculated storage and data transmission costs and later retrieve each encrypted data component upon user request. The system may combine said data components into said one or more encrypted data files, and decrypt each encrypted data file into the file originally received from a user. Upon decryption, the system may verify the data integrity of the one or more data files after said combining, and deliver the one or more data files to the user in the original form and format.

In an embodiment, the encryption and decryption of the one or more data files are performed using two unique keys, where said two unique keys are generated when encryption or decryption is performed, combined using a hashing algorithm, and destroyed once encryption or decryption is complete. The file splitting is performed by a set of algorithms where at least one of said set of algorithms splits the one or more data files into a number of smaller components of as equal size as possible, where the smaller components are known as slices, and where said at least one of said set of algorithms records the instructions needed to recombine said smaller components into the original file within said smaller components prior to storing said smaller components. In this embodiment, an algorithm may perform the file splitting into a plurality of smaller components by calculating storage and data transmission costs which are at least partly comprised of dynamic values for location storage cost, transmission/bandwidth cost, transmission time, security entropy, frequency of access, and location responsiveness to determine the appropriate number of smaller components into which the one or more data files are split. The file combining is performed by interpreting the keying data contained within each of the smaller components and merging the smaller components in the proper order to recreate the original file.

In an embodiment, file storage locations are created and stored in the system with four key functions per location, which allows the system to treat each location in the same manner through upload, download, delete, and "deleteLocation" functions. The one or more data files are stored and retrieved from locations defined by an algorithm which calculates the most efficient storage location based at least in part on dynamic parameters of location storage cost, transmission/bandwidth cost, transmission time, security entropy, frequency of access, and location responsiveness. Multiple (N) storage locations are determined for storage, and from which the system can retrieve and reassemble an entire file, even if N−1 of the storage locations are inaccessible, to achieve resiliency across different storage location providers.

Turning now to FIG. 1, this figure presents a view of the system architecture with deployment and file storage options consistent with certain embodiments of the present invention. In an exemplary embodiment, a client 1 may open communication with a private central server 2b containing an implementation of the secure data storage system. In an alternative embodiment, the client 1 may open communication with a public central server 2a in which an implementation of the secure data storage system has been installed and is operative. The client 1 may transmit one or more data files over the established network communication channel and instruct secure data storage system implemented on either the private central server 2b or the public central server 2a to initiate the secure data storage process.

In an embodiment, the secure data storage system may perform the hash, encryption, and slicing operations on the received data file(s) and transmit the results to a set of electronic storage repositories. The secure data storage system may transmit encrypted slices of the processed data file(s) to a storage repository located in the public cloud 3a, to a storage repository located in a private cloud storage system 3b, or may transmit the processed data file(s) to an off-cloud electronic storage repository 3c. Additionally, the secure data storage system may provide slices from a single transaction to more than one type of electronic storage repository, processing one or more data files and transmitting slices to the public cloud 3a, to the private cloud 3b, and to off-line storage 3c. In this manner, the secure data storage system may prevent discovery not only of the slices of the processed file(s), but may also make it more difficult to gather all of the slices from each electronic storage repository to which the slices have been entrusted.

Figure 2:
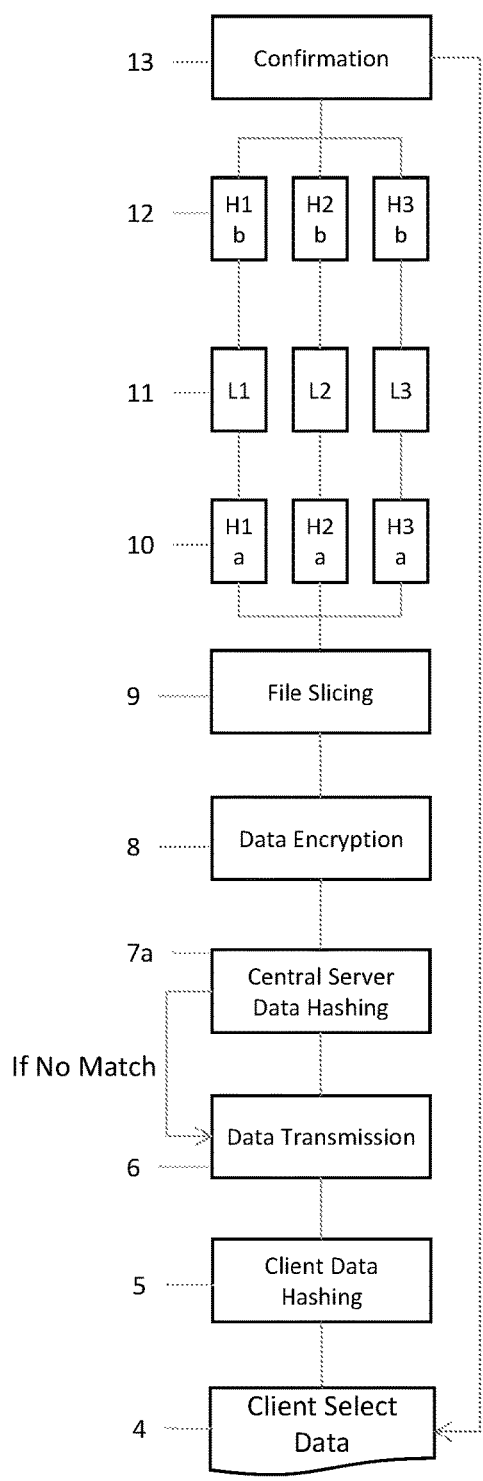
FIG. 2 is a view of the data storage and archiving process consistent with certain embodiments of the present invention.

Turning now to FIG. 2, this figure presents a view of the data storage and archiving process consistent with certain embodiments of the present invention. In an exemplary embodiment, the figure presents the data flow process when storing and archiving data within the system. The client selects the data 4 to be stored within the system. The client calculates a hash 5 of this data before transmitting it 6 to the Stash central server. The central server calculates a hash 7a of the received data, if the two hashes match, proceed to encrypt the data 8. If the hashes do not match, the client is instructed to resend the data 7b. Once the data is encrypted, the file is sliced 9 into a number of smaller data components upon which a hash is calculated for each of the smaller data components 10, hereinafter slices, the slices are transmitted to their respective storage locations 11, and another hash is performed on the slice in the storage location 12. If the hashes match, the client is informed of a successful storage/archiving process 13.

Figure 3:
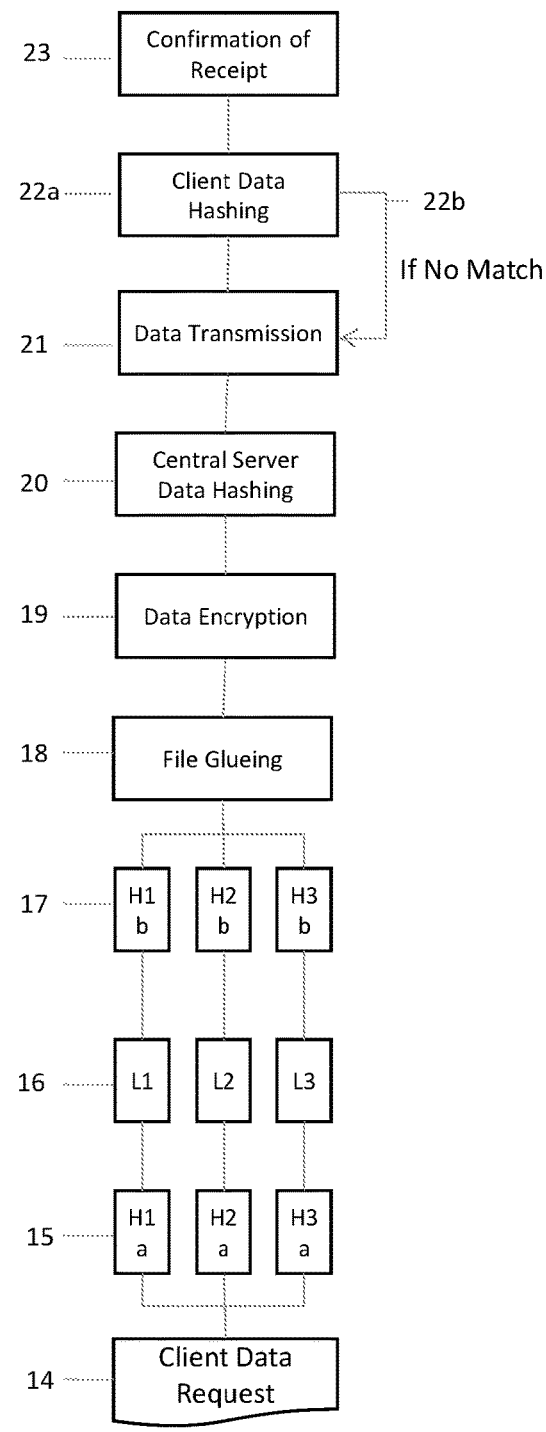
FIG. 3 is a view of the data retrieval process consistent with certain embodiments of the present invention.

Turning now to FIG. 3, this figure presents a view of the data retrieval process consistent with certain embodiments of the present invention. In an exemplary embodiment, the figure presents the data flow process when retrieving data within the system. The client selects the data 14 to be retrieved from the system. The system determines the number and location of each of the slices of the original data file and calculates the hash 15 of each slice. The slices are retrieved from their respective storage locations 16, and another hash is calculated on the retrieved slices 17 to validate the integrity of the file slices. If the hashes do not match, the system will retrieve the affected slice again. The slices are then combined in a process referred to as "glueing" 18 and the file is then decrypted 19. The central server calculates another hash of the decrypted file 20 before transmitting it to the client 21. Upon receipt, the client calculates a hash 22a of the received file, and if the hashes do not match, the system resends the file to the client 22b. If the hashes do match, the client confirms receipt 23 of the original file.

Turning now to FIG. 4, this figure presents a view of the key generation and encryption process consistent with certain embodiments of the present invention. In an exemplary embodiment, a data encryption request 24 is initiated by the central server. The server retrieves the master file proto key 25 and retrieves the user's file proto key 26 from secure locations. These keys are combined into a sequence of characters that is unique to each user and then transformed into the user's file encryption key 27. The system encrypts the data 28 using the user file encryption key and then destroys the file encryption key 29, minimizing the time the encryption key is accessible to the system.

Turning now to FIG. 5, this figure presents a view of the key generation and decryption process consistent with certain embodiments of the present invention. In this embodiment, a data decryption request 30 is initiated by the central server. The system retrieves the master file proto key 31 and the user file proto key 32 from secure locations. The system combines the two proto keys 33 into a sequence of characters that is unique to each user, and then transforms this sequence into the user's file decryption key. This key is then used to decrypt the data 34, after which, the system destroys the user file decryption key 35, minimizing the time the key is accessible to the system.

While certain illustrative embodiments have been described, it is evident that many alternatives, modifications, permutations and variations will become apparent to those skilled in the art in light of the foregoing description.

We claim:

1. A system for secure data storage and retrieval, comprising:
   a processor having network connections to a plurality of networked storage locations;
   the processor receiving one or more data files from a user through a network connection;
   encrypting said one or more data files and generating an identifier for each encrypted data component;
   splitting said one or more encrypted data files into smaller data components;
   calculating the transmission path cost from said processor to each of said plurality of networked storage archives;
   storing each identifier for each encrypted data component in an electronic storage element associated with said processor;
   storing each encrypted data component into one of the plurality of networked storage locations defined by an algorithm which calculates the most efficient storage location based at least in part on dynamic parameters of location storage cost, transmission/bandwidth cost, transmission time, security entropy, frequency of access, and location responsiveness;
   retrieving each encrypted data component upon user request;
   combining said data components into said one or more encrypted data files, and decrypting each encrypted data file into the file originally received from a user;
   verifying the data integrity of the one or more data files after said combining; and
   delivering said one or more data files to the user in the original form and format.

2. The system of claim 1, wherein the encryption and decryption of the one or more data files are performed using two unique keys, where said two unique keys are generated when encryption or decryption is performed, combined using a hashing algorithm, and destroyed once encryption or decryption is complete.

3. The system of claim 1, wherein the file combining is performed by interpreting the keying data contained within each of said smaller components and merging the smaller components in the proper order to recreate the original file.

4. The system of claim 1, wherein verifying the data integrity of the one or more data files is performed through use of a one-way hashing function, which is computed over a representative sample of the one or more data files comprising an arbitrary portion of the first part of the one or more data files, and an arbitrary portion of the last part of the one or more data files.

5. The system of claim 1, where file storage locations are created and stored in the system with four key functions per location, which allows the system to treat each location in the same manner through upload, download, delete, and "deleteLocation" functions.

6. A system for secure data storage and retrieval, comprising:
   a processor having network connections to a plurality of networked storage locations;
   the processor receiving one or more data files from a user through a network connection;
   encrypting said one or more data files and generating an identifier for each encrypted data component;
   splitting said one or more encrypted data files into smaller data components;
   calculating the transmission path cost from said processor to each of said plurality of networked storage archives;
   storing each identifier for each encrypted data component in an electronic storage element associated with said processor;
   storing each encrypted data component into one of the plurality of networked storage locations defined by an algorithm which calculates the most efficient storage location based at least in part on dynamic parameters of location storage cost, transmission/bandwidth cost, transmission time, security entropy, frequency of access, and location responsiveness;
   retrieving each encrypted data component upon user request;
   combining said data components into said one or more encrypted data files, and decrypting each encrypted data file into the file originally received from a user;
   verifying the data integrity of the one or more data files after said combining; and
   delivering said one or more data files to the user in the original form and format.

* * * * *